April 12, 1960

H. G. PISARCHIK 2,932,449

INTEGRATING APPARATUS

Filed Jan. 25, 1954

INVENTOR.
H. G. PISARCHIK
BY P.E. Henninger
ATTORNEY

April 12, 1960 H. G. PISARCHIK 2,932,449
INTEGRATING APPARATUS
Filed Jan. 25, 1954 4 Sheets-Sheet 2

INVENTOR.
H. G. PISARCHIK
BY
P. E. Henninger
ATTORNEY

April 12, 1960

H. G. PISARCHIK 2,932,449

INTEGRATING APPARATUS

Filed Jan. 25, 1954

INVENTOR.
H. G. PISARCHIK
BY
P. E. Henninger
ATTORNEY

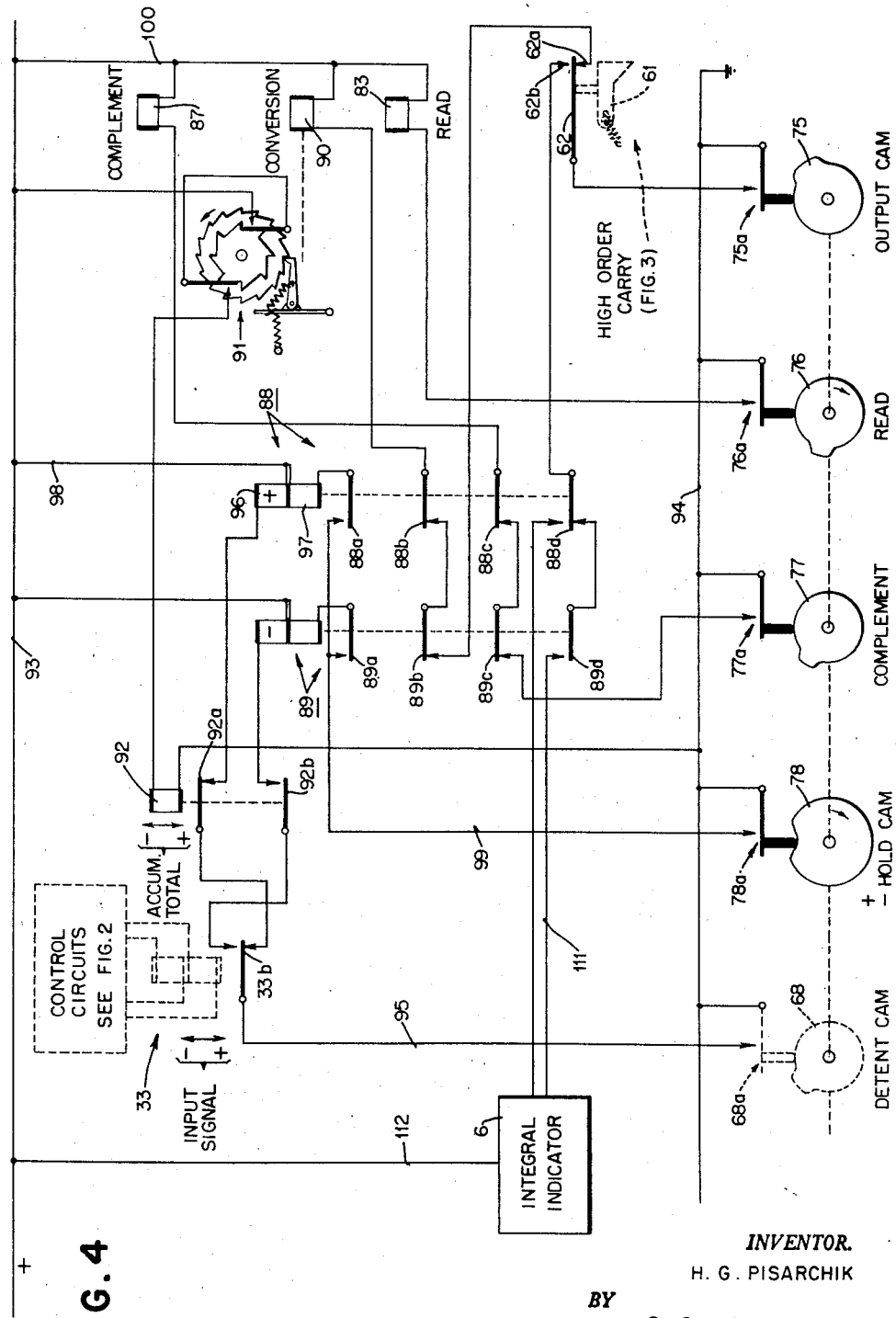

United States Patent Office 2,932,449
Patented Apr. 12, 1960

2,932,449

INTEGRATING APPARATUS

Harry G. Pisarchik, Endicott, N.Y., assignor to International Business Machines Corporation, New York, N.Y., a corporation of New York Application January 25, 1954, Serial No. 405,978

21 Claims. (Cl. 235—154)

This invention relates to integrating apparatus and particularly to apparatus capable of integrating an electric potential continuously variable over a finite range including both positive and negative values.

Prior art mechanisms for the integration of continuously variable functions have had practical limits of accuracy in the neighborhood of 0.1%. One typical prior art mechanism for integrating an electrical potential includes a motor-tachometer combination energized with the potential being integrated and having a voltage-speed characteristic such that it rotates at a speed proportional to the applied potential. The integral is recorded on an indicator driven by the motor through a gear train. Such integrating mechanisms are subject to errors caused by non-linearity in voltage-speed characteristic, changes in frequency of the supply voltage, changes in temperature, etc., so that the possibility of improving their accuracy is limited.

An object of the present invention is to provide an improved mechanism for integrating a continuously variable electric potential. A further object is to provide such a mechanism which is capable of integrating a potential which varies through both positive and negative values, and indicating whether the integrated total is positive or negative.

Another object is to provide an improved integrating mechanism whose accuracy does not depend on voltage-speed characteristic of a rotating electrical machine, but rather on the accuracy of stationary electrical impedance elements.

Another object is to provide an improved mechanism for converting a continuously variable electric potential into digital signals ordinally related according to a binary system.

Another object of the invention is to provide an improved electromechanical accumulator for such binary digital signals.

Another object is to provide an improved system for controlling an electric motor to position an output shaft driven by the motor in accordance with variations of a variable condition.

The foregoing and other objects of the invention are attained in the apparatus described completely below in connection with the accompanying drawings. Briefly, this apparatus includes an analog-digital converter for changing the applied, continuously variable potential into binary digital signals, and an accumulator for integrating, with respect to time, the binary digital signals.

The converter comprises a circuit for controlling a motor in response to the balance between the continuous input signal and a digital feedback signal produced by feedback mechanism driven by the motor. A split-phase motor is used, with one phase energized directly from the power supply and the other phase energized through an amplifier, to whose input circuit the input signal and the feedback signal are applied in opposition.

In one modification of the converter described below, the digital feedback signals are produced by selectively shunting resistors connected in series. Two sets of resistors are connected in series, the several resistors of each set having resistances respectively proportional to the several orders of a binary system. Whenever a resistor in one set is shunted, a shunt around an equal resistor in the other set in the series line is opened, so that the current flow through the series line remains constant, while the potential drop across one set only of the resistors represents the digital feedback signal.

Another modification of the converter described below employs a plurality of transformers having their secondary windings connected in series to supply the feedback signal. These transformers are preferably toroidally wound for close coupling. The voltage ratios of the transformers are proportional to the several orders in the binary system, and the primary windings of the transformers are energized or de-energized depending upon the digital signal to be registered.

In either of the converters, the accuracy depends upon the accuracy of the stationary impedance elements, specifically the resistors in the one case and the transformers in the other. With either converter, digital signals are produced which are transferred to an accumulator which operates digitally, and hence without loss of accuracy.

The accumulator includes means operating periodically in response to a time pulse, for taking a reading from the converter to transmit to the accumulator, digital signals corresponding to the quantity registered in the converter at the time of each reading. For each binary order in the accumulator, there is provided an electromagnet operating a ratchet wheel which in turn operates a cam wheel to drive carry-over levers in accordance with the angular positions of the cam and ratchet wheels. After a number is transferred to the accumulator from the converter, a group of carry cams check the carry-over levers and transmit carry-over impulses to the electromagnets of any order where the carry-over lever of the next lower order has been latched.

Means are provided to check the sign of the group of binary signals coming into the accumulator, and the sign of the total registered in the accumulator. If the signs are the same, the incoming signals are added to the total. If the signs are different, the number represented by the incoming binary signals is subtracted by the use of a complement mechanism. At the end of each cycle of operation of the accumulator, the position of the carry-over lever in the highest order is checked and if a carry-over is indicated, the accumulator sends an output pulse to an integral indicator. This output pulse is distinguished as to sign. When the total registered in the accumulator goes through zero with a change in sign, the accumulator mechanism goes through a conversion cycle to change the registered total from a complement quantity to a positively expressed quantity.

Other objects and advantages of the invention will become apparent from a consideration of the following specification, taken together with the accompanying drawings.

In the drawings:

Fig. 3 is a partial wiring diagram of an accumulator constructed in accordance with the present invention and used in cooperation with the converter of Fig. 1;

Fig. 4 is a wiring diagram of certain control circuits used in connection with the accumulator of Fig. 3. Figs. 3 and 4 together show the complete accumulator.

Figure 1 illustrates, in a schematic functional block diagram, an integrator constructed in accordance with the invention. It is considered that an understanding of the invention will be facilitated by a brief description of Fig. 1 before proceeding to a description of the detailed wiring diagrams in the other figures.

Figure 1:
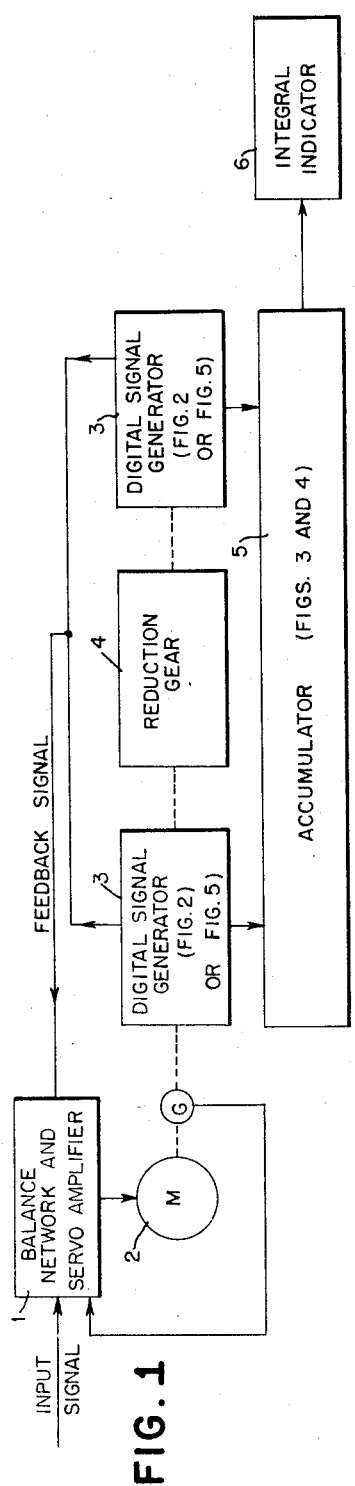
Fig. 1 is a schematic block diagram of a complete integrator using an analog-digital converter according to either Fig. 2 or Fig. 5 and an accumulator according to Figs. 3 and 4.

In Fig. 1, an input signal from an unspecified source is fed into a balance network and servo amplifier 1 which controls a motor 2. The input signal is considered to be an electrical potential continuously varying over a finite range which includes both positive and negative values.

In the balance network 1, the input signal is balanced against a feedback signal and the usual servo tachometer signal. The feedback signal is produced in a manner to be described below. When the input signal and the feedback signal are balanced, the motor 2 controlled by the balance network 1 remains stationary. When the input signal predominates over the feedback signal, the motor 2 runs in one direction and when the feedback signal predominates over the input signal the motor runs in the opposite direction.

Figure 5:
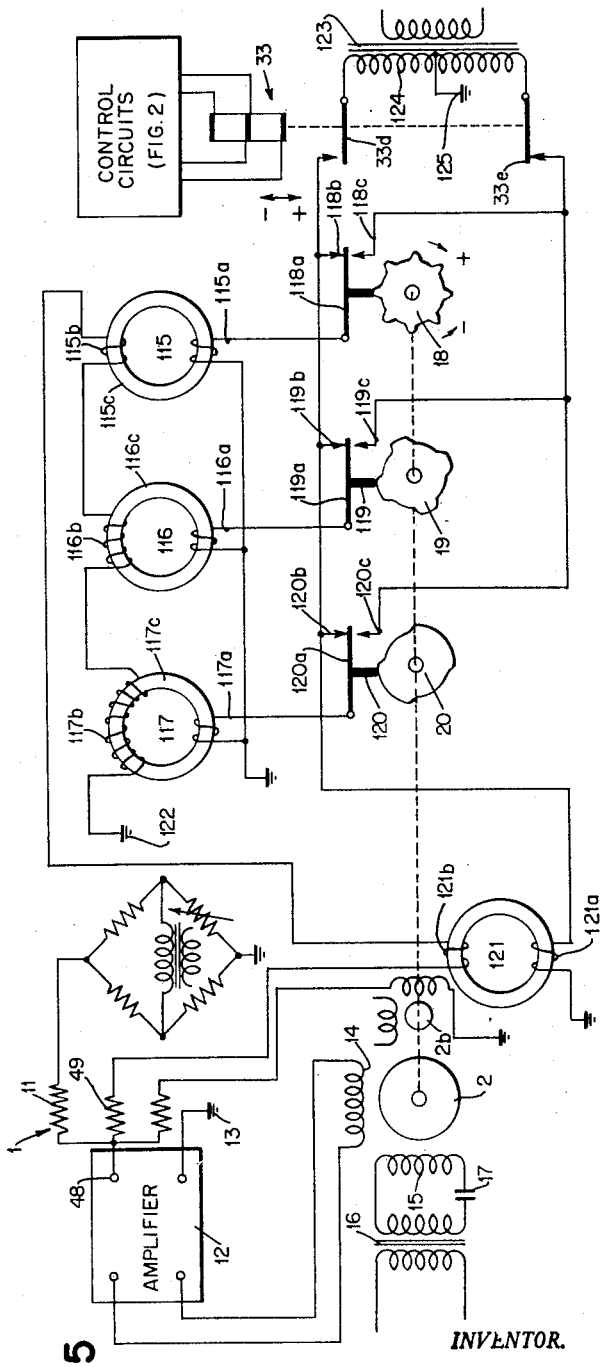
Fig. 5 is a wiring diagram of a modified form of analog-digital converter which may be used in place of the converter of Fig. 2.
Figure 2:
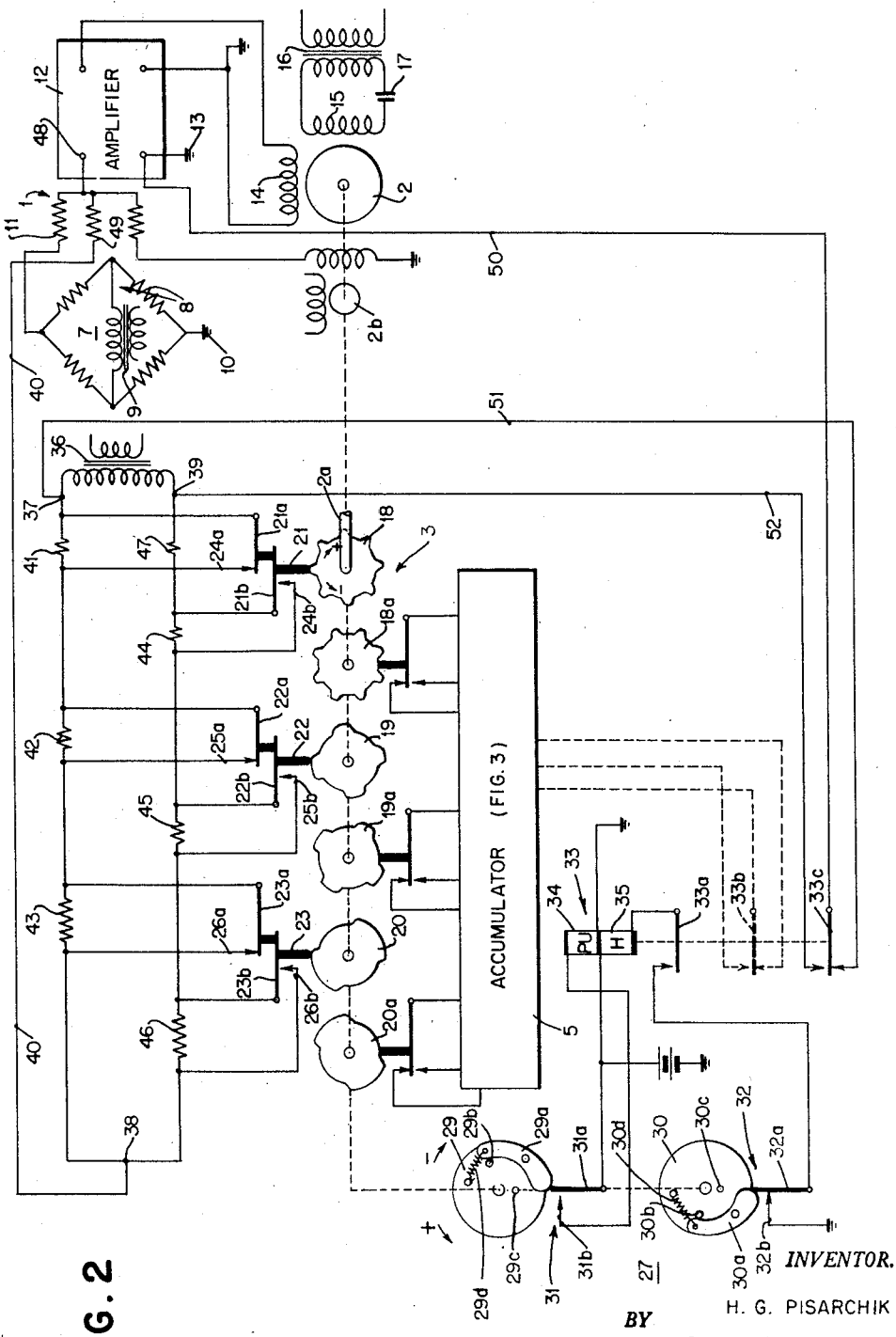
Fig. 2 is a wiring diagram of an analog-digital converter constructed in accordance with the present invention.

The motor 2 drives a converter mechanism shown in Fig. 1 as including two digital signal generators 3, each of which may be either of the type disclosed in Fig. 2 or the type disclosed in Fig. 5. These digital signal generators 3 are shown as being coupled together by a reduction gear 4 which may include a Geneva movement to provide an intermittent drive, said reduction gear having the proper ratio as determined by the number of elements in each digital generator. It will be recognized that there may be only one digital signal generator used, as in the systems illustrated in detail in Figs. 2 and 5. It should also be pointed out that more than two such generators may be used, the limit being determined by the limitations of the accuracy of the largest impedance unit used in the feedback signal mechanism.

The digital signal converters 3 produce a feedback signal which is supplied to the balance network to control the motor 2. The magnitude of the feedback signal depends upon the travel of a shaft or other element driven by the motor 2 from a normal zero position. The polarity or phase of the feedback signal depends upon the direction in which the motor shaft last departed from its zero position. The operation is such that the motor runs in a direction to produce a feedback signal that will balance the input signal and stop the motor. The normal condition of the system is that the motor has driven the digital signal generators to a position in which the feedback signal balances the input signal and the motor is stopped. The rate of change of the input signal is not ordinarily so great that any substantial time lag occurs when the input signal is not balanced by the feedback signal. However, some change may occur while a reading is being taken from the digital signal generators 3 into the accumulator 5, but this change should be eliminated before the next reading is taken.

The digital signal generators 3 provide ordinally related digital signals which at spaced time intervals are transferred to an accumulator 5. The interval between transfers of these digital signals to the accumulator may be established according to the requirements of the particular system. Usually, this interval is determined by the normal rate of variation of the input signal.

The accumulator 5 adds or subtracts each group of digital signals (as received from the generators 3) from the total previously established in the accumulator. Since the input signal can vary over a range including both positive and negative values, it is necessary that the accumulator be able to receive both positive and negative values and to indicate whether the total accumulated is positive or negative. If the sign of the input signal corresponds to the sign of the total in the accumulator, i.e., if both are positive or both are negative, then the accumulator must add the received digital signal to the previous total. If the signs are opposite, the accumulator must subtract the digital signal from the previous total.

The accumulator 5 operates a suitable integral indicator schematically illustrated at 6, in accordance with the total in the accumulator. In the particular indicator system described herein, the accumulator sends an output pulse to the integral indicator 6 each time that the accumulator total exceeds the accumulator capacity. Concomitantly, the accumulator retains the excess beyond the capacity. The accumulator distinguishes as to whether the total accumulated is positive or negative and sends correspondingly distinctive signals to the indicator 6, so that the indicator may utilize the information conveyed accordingly.

Figure 2 illustrates some details of the various elements including the balance network 1, the motor control system (including balance network 1) and the motor 2, and one of the digital signal generators indicated at 3 in Fig. 1.

In Fig. 2, the input signal (which may be any variable amplitude reversible phase voltage) is illustrated, by way of example only, as being generated in a resistance bridge circuit 7 which includes at least one variable resistor 8, the resistance of said resistor 8 being varied as a function of the output of some computing process or some other type of operation. The bridge circuit 7 is energized by a transformer 9 connected to a suitable source of alternating electrical energy.

One output terminal of the bridge circuit 7 is connected to ground at 10. The other output terminal is connected through a resistor 11 to one input terminal 48 of an amplifier 12 of conventional construction. The other input terminal of amplifier 12 is connected to ground at 13.

The output terminals of amplifier 12 are connected to control phase winding 14 of the motor 2. The motor 2 also has a fixed phase winding 15 supplied with energy from the same source which supplies bridge circuit 7, through a transformer 16 and a condenser 17. A tachometer generator 2b is driven by the motor 2 and has an output winding connected to the input of amplifier 12 as illustrated.

The motor 2 is of the split-phase type. The current flowing through the winding 15 is shifted by condenser 17 substantially 90° in phase from the phase of the source of alternating electrical energy. The current flowing through winding 14 is either in phase with the source or 180° out of phase, depending upon the phase of the input signal received by the amplifier 12. If the current flowing in winding 14 is in phase with the source, the motor 2 runs in one direction, whereas if it is 180° out of phase, the motor runs in the opposite direction. If no current flows in winding 14, the motor 2 is stationary.

The motor 2 drives the digital signal generator generally indicated at 3, which includes a shaft 2a, on which are fixed a set of feedback cams or code wheels 18, 19 and 20. Associated with the cams 18, 19 and 20 is a corresponding set of accumulator input code wheels 18a, 19a, and 20a. The function of the accumulator cams or code wheels is concerned with the operation of the accumulator 5, and will be completely described below in connection with Figs. 3 and 4.

The feedback cams 18, 19 and 20 respectively drive followers 21, 22 and 23. Each of these followers is pivoted, and operates a switch contact assembly including two movable contacts, insulated from one another, and respectively cooperating with two stationary contacts. The follower 21 positions movable contacts 21a and 21b;

which respectively cooperate with stationary contacts 24a and 24b. The follower 22 positions movable contacts 22a and 22b which respectively cooperate with stationary contacts 25a and 25b. The follower 23 positions movable contacts 23a and 23b which respectively cooperate with stationary contacts 26a and 26b.

The cams 18, 19 and 20 and their associated followers and contacts control a feedback potential, varying that potential digitally in response to the position of the shaft 2a and in accordance with a binary system. The cam 18 is the units cam of the binary system. It has eight peaks and eight valleys. The cam 19 is the two's cam, having four peaks and four valleys, and cam 20 is the four's cam, having two peaks and two valleys. All the cams are shown in Fig. 2 in their zero angular positions. In this position, the a contacts controlled by cam 18 are closed and the b contacts are open. When the shaft carrying the cam 18 rotates through an angle $$\left(\frac{180°}{8}=22.5°\right)$$

corresponding to one digital unit, the follower 21 moves from one of the peaks of cam 18 to one of the valleys, so that the a contacts are then opened and the b contacts are closed. Note that this is true regardless of whether cam 18 moves in a clockwise or positive direction as indicated by the legend in the drawing or in a counter-clockwise or negative direction.

Cams 19 and 20 in their zero positions also hold their a contacts closed and their b contacts open. Note, however, that if the shaft rotates an angle corresponding to one unit (22.5°) in the positive direction, the cams 19 and 20 maintain their a contacts closed and their b contacts open. On the other hand, if the shaft rotates through one angular unit (22.5°) in the negative direction, both cams 19 and 20 open their associated a contacts and close their associated b contacts.

A switch mechanism is provided, as described in detail below, so that only the a contacts or the b contacts of the digital signal generator 3 are active at any particular time.

The following Table I presents a complete analysis of the operation of the various contacts for one half revolution of the shaft driving the cams 18, 19 and 20. In this table, a "0" shows that the contact in question is closed, and "1" shows that the contact is open. The table shows the relationships which exist for both a and b contacts and for both a half revolution in the positive direction from zero and a half revolution in the negative direction.

TABLE I

| Angular Units of Rotation | 20 19 18 a Contacts | 20 19 18 b Contacts |
|---|---|---|
| 0  | 0 0 0 |       |
| +1 | 0 0 1 | 1 1 0 |
| +2 | 0 1 0 | 1 0 1 |
| +3 | 0 1 1 | 1 0 0 |
| +4 | 1 0 0 | 0 1 1 |
| +5 | 1 0 1 | 0 1 0 |
| +6 | 1 1 0 | 0 0 1 |
| +7 | 1 1 1 | 0 0 0 |
| +8 | 0 0 0 | 1 1 1 |
| −1 | 1 1 1 | 0 0 0 |
| −2 | 1 1 0 | 0 0 1 |
| −3 | 1 0 1 | 0 1 0 |
| −4 | 1 0 0 | 0 1 1 |
| −5 | 0 1 1 | 1 0 0 |
| −6 | 0 1 0 | 1 0 1 |
| −7 | 0 0 1 | 1 1 0 |
| −8 | 0 0 0 | 1 1 1 |

In the column at the left is shown a number representing a numeral in the decimal system to be converted by the cams and their associated contacts to a numeral in the binary system. Each decimal numeral in the left-hand column represents a rotation of the shaft and its associated cams through an angle equal to that numeral times 22½°, which is one unit angular displacement of the shaft.

The cam 19 has four peaks and four valleys, each peak and each valley being twice as long as the peaks and valleys at cam 18, each peak and valley representing a circumferential angle of 45°. The peaks and valleys on cam 20 in turn are twice as long as those on cam 19, each peak and valley extending for 90°. It will be readily understood that the binary system which includes these cams may be readily extended through the 8's order by providing a cam having one peak and one valley, each extending through 180°. Thus four binary digital orders in the converter will be able to convert any number up to 16 in the decimal system. If further binary digital orders are required, the 4 cam generator unit may be connected serially to a second digital signal generator unit through a proper ratio reduction gear as indicated at 4 in Fig. 1. Such reduction gear ratio will be 16:1 where four binary digital orders are set up on the cams and for each revolution of the lower order cam generator unit, the next higher order cam generator unit would move through one unit angular displacement, i.e., 22½°. The movement is intermittent, however, by means of a Geneva movement in the reduction gear unit. Further digital converter units may be utilized through further reduction gears. If desirable, the higher order units may be operated from the motor driven shaft 2a by means of a switch driving a reversible electromagnetic ratchet mechanism, so that the motor shaft does not carry the load of the higher order units.

It will be appreciated that the principles of operation will be exactly the same if a fourth pair of cams or code wheels is attached to the shaft 2a to extend the binary system through the 8's order. It is for this reason that the pair of cams having only one peak and one valley each extending 180°, has not been illustrated.

As described in detail below, in this feedback signal generator, an open contact provides a positive indication of its corresponding digit. Bearing this in mind, and referring to Table I, it may be seen that when the shaft is turning in the positive direction the a contacts correctly translate the decimal numbers in the left-hand column into their binary equivalents. The b contacts on the other hand translate the decimal numbers in the left-hand column into the binary equivalents of the 7's complements of those numbers.

When the shaft is turning in the negative direction, as indicated by the minus numbers in the left-hand column in the table, the a contacts translate the absolute values of the numbers in the left-hand column into the 8's complements of those numbers. The b contacts on the other hand translate the absolute values of the numbers in the left-hand column into the binary equivalents of those numbers minus one.

There is generally indicated by the reference numeral 27 (Fig. 2) an input signal sign discriminating mechanism, which is driven from the shaft of motor 2. When a plurality of digital signal generators 3 are provided, the sign discriminating mechanism 27 is mounted on the shaft of the highest order generator. This mechanism includes a pair of disks 29 and 30. Pivoted on each of these disks near its periphery is an arcuate arm, respectively numbered 29a and 30a. The arms 29a and 30a are movable between stops 29b, 29c and 30b, 30c respectively, but are biased to the illustrated positions by means of a light spring 29d and 30d, in each case.

There is mounted adjacent the arm 29a for actuation thereby a switch 31 including a movable contact 31a and a stationary contact 31b. The switch 31 is normally open as shown in the drawing. Mounted adjacent the arm 30a for actuation thereby is a switch 32 having a movable contact 32a and a stationary contact 32b. The switch 32 is normally closed, as shown. The switches 31 and 32 control an input signal sign discriminating relay generally indicated at 33 and having a pick-up winding 34 and a holding winding 35. The relay 33 operates three sets of contacts: a contact 33a which is connected in a circuit for energizing its own holding winding; a contact 33b connected in certain circuits of the accumulator 5, as described below in connection with Figs. 3 and 4; and a contact 33c which controls the sign of the feedback signal potential generated by the digital signal generator 3.

The disks 29 and 30 are shown in their zero positions. Consequently, when disk 29 is rotated in a clockwise direction from the position shown, arm 29a closes switch 31 and thereafter rides up over contact 31a, pulling said arm away from stop 29b until it is past contact 31a. Upon a reversal in the direction of rotation arm 29a again rides up over contact 31a and returns to the position shown. Further rotation in the counterclockwise direction does not affect the normally open switch 31. The operation of switch 32 by the mechanism on disk 30, is similar to the operation of switch 31 by the mechanism on disk 29, except that switch 32 is opened from the position shown by counterclockwise rotation of disk 30.

When the disks 29 and 30 turn in a positive or counterclockwise direction from their zero positions, the normally open switch 31 remains open and the normally closed switch 32 is opened during the initial part of that movement by the arm 30a. Consequently, both the circuit for the pick-up winding 34 of relay 33 and the circuit for holding winding 35 of relay 33 are open and the relay 33 remains de-energized as long as the disks 29 and 30 remain displaced counterclockwise from their zero positions. On the other hand, if the disks 29 and 30 start moving in the negative or clockwise direction from their zero positions, then the normally open switch 31 is closed and energizes the pick-up winding 34. Relay 33 then picks up its contacts, and the circuit is closed for the holding winding 35 through the holding contact 33a and the normally closed switch 32 which remains closed as long as the disks 29 and 30 remain displaced clockwise from their zero positions. The contacts of relay 33 are therefore picked up and remain picked up until the normally closed switch 32 is opened by the passage of the disk 30 through its zero position in a positive or counterclockwise direction.

The position of contact 33c of relay 33 determines the sign or phase of the feedback potential, which is supplied by a network including a transformer 36 having a positive signal resistance line connected between its upper secondary terminal 37 and an electrically shiftable midpoint 38, and a negative signal resistance line connected between its lower secondary terminal 39 and the same shiftable midpoint 38. The positive signal resistance line includes in series three digitally related resistors 41, 42 and 43, whose respective resistance values are proportional to the values of the three binary orders involved. In other words, the resistance of the resistor 42 is twice that of resistor 41 and the resistance of resistor 43 is twice that of resistor 42. A similar series of resistors 44, 45 and 46 is connected in the negative signal resistance line. There is also connected in the negative signal resistance line another resistor 47 having the same resistance as the units order resistor 44.

Depending upon the position of contact 33c of relay 33, either the positive resistance line or the negative resistance line is connected in series with the electrically shiftable midpoint 38 and the grounded input terminal 13 of amplifier 12. The point 38 is directly connected via a fixed resistor 49 to the other input terminal 48 of the amplifier 12. When the contact 33c is in its down position, as shown, the positive resistance line is connected to ground from terminal 37 to input terminal ground 13, while the other end of this positive resistance line is connected to point 38 and thence via resistor 49 to input terminal 48 of the amplifier 12. Note, however, that when the parts are in the positions shown in the drawing, each of the resistors 41, 42 and 43 is shunted by closure of the a contacts on its associated order cam in the digital signal generator 3. Consequently, the input terminal 48 of amplifier 12 is connected to ground through the protective resistor 49, and the positive signal input is zero. If the bridge circuit 7 is balanced, then its upper output terminal is also at ground potential, and no input potential is being applied to the input terminals of amplifier 12, so that the motor 2 remains stationary.

When any of the a or b contacts (of switches 24, 25 and 26) is closed, its associated resistor (41, 42, 43, 44, 45 or 46) is shunted. When any a or b contact is open, its associated resistor is not shunted, but is connected in series with either the positive resistance line or the negative resistance line, as the case may be. The potential drop across that resistor then becomes a part of the feedback signal potential supplied to the input circuit of the amplifier 12 through the connection just traced. Therefore, an open contact may be said to provide a positive indication of the corresponding digit as stated above. For any given position of the shaft 2a, the cams 18, 19, 20 translate that angular position into a feedback signal potential which measures that angular position in accordance with a binary system, as shown in Table I.

When the digital signal generator 3 is operated in the negative direction from its zero position, the sign discriminating mechanism 27 operates the switches 31 and 32 to close their respective circuits so that the relay 33 picks up its contacts, as described above. The feedback signal into the amplifier 12 is then derived from the negative feedback resistance line, i.e., resistors 47, 44, 45 and 46. The circuit for this signal may be traced from amplifier input terminal 48 through resistor 49, wire 40, point 38, resistors 46, 45, 44, 47, terminal 39, wire 52, contact 33c and its associated stationary front contact, and wire 50 to ground connection 13. At this time, the feedback signal is determined by the positions of the b contacts, rather than the a contacts. As pointed out in connection with Table I above, the b contacts do not provide a digital signal which measures the exact angular displacement of the motor shaft from its zero position, but on the other hand they provide a digital signal which is one unit less than the true digital relationship. The resistor 47 supplies the missing one unit of potential drop, equal in magnitude to the potential drop across resistor 44, so that the input signal potential during this phase of operation of the feedback system is a correct measure of the departure of the signal generator shaft from its zero position.

It may be seen that the positive resistance line and the negative resistance line together constitute a voltage divider circuit connected across the terminals of the secondary of transformer 36. The switch contact 33c of relay 33 determines whether the feedback potential to be applied to amplifier 12 is derived from the section of this voltage divider connected to the upper secondary terminal 37, or from the section connected to the lower terminal 39. The contacts operated by cams 18, 19 and 20 determine which resistances shall be shunted from the two sections of the voltage divider, and consequently determine the magnitude of the feedback potential. Since one of the two resistors associated with each order is always connected in the voltage divider circuit, and both are never connected at the same time, it may be seen that the total resistance connected in series between terminals 37 and 39 is always the same, so that the current flow through the voltage divider circuit is always constant and the potential drop across each of the several resistors is consequently always constant. Therefore for any given position of the cams 18, 19 and 20, a fixed feedback potential is determined, and this feedback potential is a measure of the angular displacement of the shaft 2a from its zero position. The accuracy of this feedback potential depends only upon the accuracy with which the resistors 41, 42, 43, etc., maintain their designed resistance values.

In this specification, potentials of the same phase as the source of supply are sometimes defined as positive potentials and those of the opposite phase as negative potentials. Also, the word "polarity" may sometimes be used to indicate phase relationships. Since the phase relationships determine the instantaneous polarity of any potential in the circuit, the use of this terminology is considered to be permissible. Furthermore, this terminology is fairly common in the art.

*Operation of digital signal generator—Fig. 2*

With the parts in the positions shown in the drawing, assume that the balance of the bridge circuit 7 is disturbed so that its upper output terminal increases in potential to four volts positive. Since the feedback potential at this time is zero, a positive potential is applied to the amplifier input terminals and the motor 2 is driven in a positive direction. The cams 18, 19 and 20 and their associated contacts go through the cycles indicated in Table I. When the cams reach the 1 position, the shunt around resistor 41 is opened, thereby transmitting a feedback potential of, for example, one volt to the amplifier input terminal 48.

The polarity of the windings of transformer 36 should be arranged so that the feedback signal potential as applied through resistor 49 to the input of amplifier 12, is of the opposite polarity with respect to ground as compared to the polarity of the input signal potential received from the bridge circuit 7 through protective resistor 11 to the input of the amplifier 12.

The cams 18, 19 and 20 continue to run until the 4 position is reached, at which time the resistor 43 has its shunt open and the resistors 41 and 42 have their shunts closed. The feedback mechanism is then applying a potential of −4 volts through resistor 49, while the bridge circuit 7 is applying a potential of +4 volts through resistor 11. The resistors 11 and 49 constitute a summing network together with the resistor connected to the tachometer generator 2b. There is then no input signal to the amplifier and the motor 2 is stopped with the feedback potential in a condition of balance with respect to the input signal potential.

The operation of the digital signal generator is analogous for other input signal potentials supplied by the bridge circuit 7. In each case, the motor runs until an equal potential of opposite polarity is established in the one of the resistance lines which is connected to the amplifier input, whereupon the motor stops.

*Figs. 3 and 4*

Figures 3 and 4 illustrate the details of the accumulator 5 operated by accumulator cams 18a, 19a and 20a of Fig. 2. The accumulator cams 18a, 19a and 20a respectively operate movable contacts 84, 85 and 86 (Fig. 3) between stationary contacts 84a and 84b, 85a and 85b, and 86a and 86b, respectively. In the accumulator, when the cams 18a, 19a and 20a are turning in a positive direction the closure of one of the *a* contacts is a positive indication of a digit in that order to be transferred to the accumulator. Table I above applies to the accumulator contacts 84, 85 and 86 just as it did to the converter contacts 21, 22 and 23. It should be noted, however, that the figure "1" in Table I is a positive indication of the presence of a digit. In the case of these accumulator contacts, therefore, the figure "1" is an indication that the contacts are closed, whereas in the case of the converter contacts, the figure "1" indicated that the contacts were open. (Note that open contacts in Fig. 1 result in a positive indication, due to the opening of a shunt around one of the resistance elements in the feedback system network.)

Each of the accumulator cams 18a, 19a and 20a correspond to one of the converter cams 18, 19 and 20. The followers 84, 85, 86 of the accumulator cams correspond to the followers 21, 22, 23 of the converter cams. Whenever the angular position of shaft 2a is such that a particular number is positively indicated by the converter cams and their followers, the same number is positively indicated by the accumulator cams and their followers.

It will be readily understood that other equivalent arrangements of the converter cams and followers and the accumulator cams and followers could readily be used. For example, a single set of cams could be used to drive both the converter followers and the accumulator followers. Furthermore, the accumulator contacts could be arranged for operation by the same followers which operate the converter feedback contacts. For purposes of illustration, however, it is considered best to show separate sets of cams, followers and contacts for the converter and for the accumulator.

The accumulator illustrated has four orders of accumulator wheels, whereas the converter mechanism which drives the accumulator has only three. This is in accordance with the usual practice in computing mechanisms, as accumulators are commonly provided with more orders than their input mechanisms. It should be understood that the number of orders selected for illustration in the converter and in the accumulator in the present instance are selected for convenience of illustration only, and that, in actual apparatus embodying the invention, other numbers of orders for the converter and the accumulator may be used, as convenient. Also the number of orders in the accumulator may exceed the number of orders in the converter by any desired amount depending upon what the output of the accumulator is to represent.

It is to be noted that although an electro-mechanical type accumulator is disclosed herein, an electronic type of accumulator could be used if desired. Because of the relatively slow speed of operation of the accumulation cycles in the operation of the apparatus of this invention, the electro-mechanical type of accumulator may be used and the superior reliability of such type is thus gained.

Each of the cams 18a, 19a, and 20a controls the energization of an electromagnet 56, one of which is provided for each order of the binary system. Each electromagnet 56 operates an arm 57 carrying a pawl 58 which cooperates with a ratchet wheel 59. Fixed on the shaft of each ratchet wheel 59 is a carry-over wheel 60 having formed on its periphery a series of spaced teeth 60a. The number of teeth on each carry-over wheel 60 is one-half the number of teeth on each ratchet wheel 59. Each ratchet wheel 59 and its associated carry-over wheel 60 are hereinafter termed an accumulator wheel. The teeth 60a correspond in their angular dimensions to the teeth on the ratchet wheel 59, but the teeth 60a are spaced apart on the periphery of the wheel 60 by smooth portions of the wheel whose angular dimensions are substantially equal to or even somewhat greater than the angular dimensions of one tooth 60a. The carry-over wheel 60 and the teeth 60a operate a carry-over follower 61 which in turn actuates a carry-over contact 62. The arrangement is such that each time the electromagnet 56 is energized, the ratchet wheel 59 is advanced one notch. The carry-over wheel 60 is of course advanced at the same time through a corresponding angular displacement, which corresponds either to the space between two teeth 60a or to the space spanning a tooth 60a. The follower 61 is actuated only on alternate advances of the ratchet wheel 59. Upon energization of the electromagnet 56 (with the parts in the positions shown in the drawing) the carry-over wheel 60 is moved through one unit angular displacement, but does not actuate the follower 61. The next time the electromagnet 56 is actuated, a tooth 60a moves under the follower 61 and lifts it upward. An over center spring 63 is associated with the follower 61 so that when the follower is moved upward by tooth 60a it is held upward by the spring 63 which is moved over center by the follower 61. The tooth 60a does not remain under the follower 61, but clears it during its movement through one unit angular displacement, so that the follower 61 is free to drop back into engagement with the wheel 60, except that it is held by the spring 63. The upward movement of the follower 61 closes the contact 62 against its associated stationary contact and holds it there.

The positions of the accumulator wheels 59, 60 shown in the drawings, and the equivalent angular positions attained when the ratchet wheels are advanced an even number of notches from those positions, may be termed the "0" positions, and the alternate intervening positions may be termed the "1" positions. It may be seen that when an accumulator wheel is advanced from a "0" to a "1" position, the follower 61 is not actuated, but that when a wheel advances from a "1" to a "0" position, its associated follower 61 is actuated.

The accumulator wheels of the first, second and third orders are each provided with a position checking switch lever 110, operated by a follower engaging the periphery of the carry-over wheel 60. Each lever 110 carries at least one movable contact cooperating with a stationary contact. The arrangement is such that all the switch contacts of any lever 110 are open when the accumulator wheel of that order is in its "0" position, and closed when the accumulator wheel is in its "1" position. Lever 110 for the lowest order carries three movable contacts 110a, 110b and 110c. Lever 110 for the second order carries two movable contacts 110a and 110b. Lever 110 for the third order carries only one movable contact 110a.

The numbers registered by the converter cams 18a, 19a and 20a are periodically transferred into the accumulator at intervals determined by a pulse timer 64 driven by a clock motor 65. The pulse timer 64 controls a one revolution clutch 66 connected between a continuously running motor 67 and a series of cams driven thereby. This series of cams includes a detent cam 68, a carry-over lever restoring cam 69, carry-over cams 70, 71, 72 and 73, and (see Fig. 4) an output cam 75, a read cam 76, a complement cam 77 and a plus-or-minus hold cam 78.

The detent cam 68 controls the energization of an electromagnet 79 which operates a detent 80 cooperating with a star wheel 81 fixed on the shaft of converter motor 2. The detent 80 stops the rotation of the converter motor shaft 2a during a transfer of a number from the converter into the accumulator, so as to avoid incorrect readings from the converter.

The carry lever restoring cam 69 operates a carry lever restoring mechanism at the end of each transfer cycle so as to move restoring rods 82 downwardly into engagement with each of the carry-over followers 61 and thereby return them to their normal positions in engagement with their respective carry-over wheels 60.

The carry-over cams 71, 72 and 73 operate after each transfer of a number from the converter and send an energizing pulse through any of the carry-over contacts 62 which may be closed into the electromagnet 56 of the accumulator mechanism for the next higher order.

The carry-over cam 70 and its associated contact 70a is not typical of the carry-over cams, but controls a circuit operated only when the accumulator is being driven through the b contacts of the switches 84, 85 and 86, as described below.

The output cam 75 operates near the end of each transfer cycle and initiates an output pulse if the carry-over lever from the highest order carry-over mechanism is in its carry position. The output cam also performs certain functions during a conversion cycle which takes place when the total registered in the accumulator shifts from a positive to a negative quantity, or vice versa.

The read cam 76 operates during each transfer cycle to energize a relay 83 which operates contacts to connect follower contacts 84, 85 and 86 associated respectively with the converter cams 18a, 19a and 20a, to their respective order electromagnets 56.

The complement cam 77 closes a switch 78a during each transfer cycle, which, if other conditions are proper, energizes a complement relay 87 having certain functions during subtraction.

The plus-or-minus hold cam 78 operates a follower switch 78a which controls holding circuits for a pair of positive and negative polarity control relays 88 and 89.

The output cam 75 and the polarity control relays 88 and 89 cooperate to control a conversion relay 90. The conversion relay operates during a conversion cycle, namely when the accumulator shifts from a condition of positive total accumulation to a condition of negative total accumulation. The conversion relay 90 operates a ratchet mechanism 91. The ratchet mechanism 91 controls an energizing circuit for an accumulator total sign sensing relay 92, hereinafter referred to as the "readout" relay.

The condition of energization of the input signal polarity sensing relay 33 is determined by the sign of the input signal, as explained above in connection with Fig. 2. The condition of energization of the read-out relay 92 is controlled by the sign of the total in the accumulator, as explained in detail below. Relays 33 and 92 cooperate with the plus-or-minus hold cam 78 to control energizing circuits for the polarity control relays 88 and 89, whose condition of energization determines whether, on any given transfer cycle, the operation is to be one of addition or subtraction. The read relay 83 is energized once during each transfer cycle, being controlled solely by the cam 76. The complement relay 87 and the conversion relay 90 are controlled respectively by the complement cam 77 and the output cam 75. The polarity control relays 88 and 89 also cooperate in the control of the energization of complement relay 87 and conversion relay 90. The high-order carry lever 61 also cooperates in the control of conversion relay 90. The transmission of output pulses from the accumulator to the integral indicator 6 is controlled by the high-order carry lever 61 and the polarity control relays 88 and 89.

Power is supplied to the various relays and electromagnets through a pair of supply lines 93 and 94, hereinafter sometimes referred to as the positive and negative supply lines. It should be apparent that these terms are used simply for identification, and it is not thereby intended to indicate that the power supply is necessarily unidirectional or that any particular polarity is required.

*Operation of Figs. 3 and 4*

The functioning of the various accumulator circuits can best be understood by running through a sequence of specific typical operations. The following sequence will be described. First, starting with the accumulator at zero, a binary indication corresponding to the decimal 7 will be transferred from the converter to the accumulator. Second, the number 6 will be transferred from the converter to the accumulator, resulting in a total of 13 in the accumulator. Third, the number 2 will be subtracted from the total in the accumulator leaving the total 11. Fourth, the number 7 will be added to the accumulator, making the total in the accumulator 18, which is more than its capacity of 16. Consequently, the accumulator will produce a positive output pulse to the integral indicator and will be left with a total of 2. Fifth, the number 6 will be subtracted from the total of 2 in the accumulator, resulting in the operation of the accumulator through a conversion cycle so that the total remaining therein will be in the form of the absolute value (4) of a negative quantity. Sixth, a further negative quantity, −7, will be added to the −4 in the accumulator, making the accumulator total −11. Seventh, another −7 is added to the accumulator making a total of −18, so that the accumulator produces a negative output pulse and is left with a −2 total. Eighth and last, a positive 3 is added, so that the accumulator runs through another conversion cycle and produces a total of +1.

*Transfer of +7 from converter to accumulator*

The parts are shown in the drawings in their zero positions, and the accumulator cams 68–78 are in the positions they have at the beginning of a transfer cycle. Let it be assumed that the converter motor now rotates the shaft carrying the cams 18a, 19a and 20a through an angle of 157½° corresponding to the sum of seven angular increments of 22½° each. At the end of this rotation, all three of the switches 84, 85 and 86 will be closing their *a* contacts. Note, for comparison, the three 1's in the columns headed "*a* contacts" in Table I opposite the number +7 in the left-hand column.

It is further assumed that the pulse timer 64 at this time actuates the one revolution clutch 66 and starts the cams 68 to 78 through a complete revolution in the clockwise direction. As the cams rotate, the detent cam 68 first closes its follower switch 68a, and thereby completes an obvious circuit to energize the electromagnet 79 and move the detent 80 into engagement with the detent wheel 81 and thereby hold the cams 18a, 19a and 20a stationary. These cams will be held stationary only during the initial part of the transfer cycle. The detent cam 68 and its associated contact 68a also close a circuit to check the correspondence or non-correspondence as to sign of the input signal and the accumulator total. This circuit is shown in Fig. 4. For convenience in describing this circuit, the detent cam 68 is repeated in dotted lines at the lower left-hand corner of Fig. 4.

At this time the input signal is positive, so that relay 33 is de-energized. The accumulator total is zero, and the read-out relay 92 remains in the condition shown, that is, de-energized, indicating that the accumulator total is positive. (When the accumulator total is zero, the read-out relay 92 may be in either its positive or negative condition.)

The correspondence checking circuit may be traced in Fig. 4 from the negative supply line 94 through switch 68a, conductor 95, contact 33b of relay 33 and its associated stationary back contact, contact 92a of read-out relay 92 and its back contact, the pick-up winding 96 of positive polarity control relay 88 and wire 98 to the positive power supply line 93. Relay 88 therefore picks up and closes an energizing circuit for its holding winding 97, which may be traced from positive supply line 93 through wire 98, winding 97, contact 88a, wire 99 and switch 78a to negative supply line 94. The positive polarity control relay 88 remains picked up by virtue of the continued energization of this holding circuit. Note that cam 78 holds switch 78a closed throughout the remainder of the transfer cycle.

(If the input signal polarity checking relay 33 and read-out relay 92 indicates a negative input signal and a negative accumulator total, then negative polarity control relay 89 picks up. If one of the two relays 33 and 92 is in its negative position and the other in its positive position, then neither of the polarity control relays 88 and 89 picks up.)

The complement cam 77 next closes its contact 77a to check whether the transfer cycle should be one of addition or subtraction. Thus switch 77a controls an energizing circuit for complement relay 87 which may be traced from the negative supply line 94 through switch 77a, back contact 89c of negative polarity control relay 89, back contact 88c of positive polarity control relay 88, to the winding of relay 87 and thence through wire 100 to positive supply line 93. It may be seen that this circuit is completed only when both the polarity control relays remain de-energized. Since in the present cycle the positive polarity control relay 88 has been energized, the complement relay circuit is open and the latter relay is not energized. If the cycle is one of subtraction rather than addition, then complement relay 87 is energized.

While the detent remains engaged with the detent wheel 81, and after the complement cam 77 has checked the complement relay circuit, the read cam 76 closes its switch 76a and thereby completes an obvious energizing circuit for read relay 83. Energization of read relay 83 transfers its four contacts 83a, 83b, 83c and 83d (see Fig. 3) from their back to their front positions, thereby placing the *a* contacts of the switches 84, 85 and 86 in series with the accumulator electromagnets 56 of the respective orders. Only the circuit for the first order cam operated switch 84 will be traced, from positive power supply line 93 through wire 101, back contact 92c of read-out relay 92, wire 102, contact 84a, switch 84, wire 103, contact 83a and thence through the winding of electromagnet 56 to the negative supply line 94. Since all three *a* contacts of the switches 84, 85 and 86 are now closed, all three of the electromagnets 56 of the three lowest orders in the accumulator are now energized, and operate their associated pawls 58 to advance the ratchet wheels 59 through a unit angular movement, corresponding to the registration of one digit in the accumulator. The energization of the electromagnet 56 is only momentary since the read cam 76 opens the switch 76a again, thereby de-energizing relay 83 and opening all the read circuits for the electromagnets 56. After the read circuits are opened, the carry-over cams 70, 71, 72 and 73 close their respective switches. The contours of these cams are such that all their associated switches are closed concurrently and then opened in sequence, with the lowest order opening first. Each one of the switches 71, 72 and 73 controls a carry-over circuit from the order with which it is associated to the next higher order. The circuit controlled by cam 71, including switch 71a, is typical. This circuit may be traced from the positive power supply line 93 through a wire 104, switch 71a, carry-over switch 62, the back contact 83b and thence through wire 105, and the winding of electromagnet 56 to the negative power supply line 94. This circuit is completed by the cam 71 only if the carry-over contact 62 is latched up by the carry-over wheel 60. In the particular transfer operation being presently described, none of the carry-over contacts 62 of the several orders is latched up, since the respective carry-over wheels 60 are moved only from a "0" position to a "1" position. (The carry-over levers 61 are latched up only when the carry-over wheels 60 move from a "1" position to a "0" position.) Consequently, in the transfer cycle being presently described, there is no carry-over energization of any of the electromagnets 56.

After the last carry-over cam has opened its associated contact, the output cam 75 closes its switch 75a to check the position of the high-order carry lever 61. This lever is not in its carry-over position, but is in the position shown in the drawings, where its movable contact 62 is engaging the lower stationary contact 62a. However, the circuit through contact 62a is open at contact 88b of the positive polarity control relay, so that no action is initiated at this time by the operation of the output cam.

The hold cam 78 then opens its associated contact 78a de-energizing the holding circuits for the polarity control relays 88 and 89, and the carry-lever restoring cam 69 operates its mechanism, which at this time is ineffective because none of the carry-over levers were latched up. The transfer cycle is then complete. During this cycle, the carry-over wheels for the three lower orders have been moved from their "0" to their "1" positions so that the quantity 7 is now registered in the accumulator in accordance with the binary system.

*Addition of +6 to +7 in accumulator*

Assume that before the next cycle, the converter motor 2 moved the shaft backward toward its zero position one angular displacement unit so that the cams 18a, 19a and 20a indicate 6. During this movement, the followers 85, 86 will continue to hold their a contacts closed, but the contact 84 moves to open its a contact. Consequently, the read circuits for the second and third order accumulator wheels 60 are partially completed through the contacts 85a and 86a, but the read circuit for the first order carry-over mechanism is open at contact 84a.

When the read cam 76 closes the energization circuit for read relay 83, the read circuits for electromagnets 56 of the second and third orders are established. These electromagnets then operate their associated carry-over wheels and move them from their "1" positions to their "0" positions. During this movement, each of these carry-over wheels, latches up in its associated carry-over lever 61, thereby closing its carry-over switch 62. When the carry-over cams subsequently close their contacts, a carry-over circuit is established for the electromagnet 56 of the third order which may be traced from positive supply line 93 through wire 104, switch 72a, carry-over switch 62 of the second order, back contact 83c, wire 106, and thence through the winding of electromagnet 56 of the third order to the negative supply line 94. The carry-over wheel for the third order is thereby advanced an additional notch, to a 1 position. A similar carry-over circuit is established through the carry-over contact 62 of the third order and advances the carry-over wheel of the fourth order to a 1 position. The four orders then read as follows:

$$1\ \ 1\ \ 0\ \ 1$$

which, in the binary notation, represents 13.

The cycle proceeds to its termination as before, with the output cam 75 checking the position of the high order carry lever 61 and providing no output pulse, since that lever has not carried.

*Subtraction of −2 from +13 in accumulator to give 11*

Let is be assumed that before the next cycle, the converter motor turns the cam shaft 2a back through the zero position to the −2 position. In this position, the cams have rotated counterclockwise 45° from the position shown in the drawing. The a contacts then indicate the 8's complement of 2, as shown in Table I. When the converter shaft goes through its zero position, the input signal polarity sensing relay 33 is picked up, so that contact 33b engages its front contact. The read-out relay remains de-energized, showing that the total in the accumulator is positive, and that there is now non-correspondence between the polarity of the input signal and the polarity of the accumulator total. Consequently, neither of the pick-up circuits for the polarity control relays 88 and 89 is completed when the detent cam closes its contact 68a and thus those relays remain de-energized throughout the remainder of this cycle.

When the complement cam 77 closes its switch 77a, an energizing circuit is established for the complement relay 87. This circuit may be traced from the negative supply line 94 through switch 77a, contacts 89c and 88c, the winding of complement relay 87 and wire 100 to the positive supply line 93. Energization of complement relay 87 closes its contact 87a to supply an energizing pulse to the electromagnet 56 of the high order carry-over wheel. If there is more than one high order wheel beyond the number of orders supplied by the converter, then each of them should receive a pulse through a contact of the complement relay at this time. This energization of the electromagnet 56 for the high-order carry-over wheel advances it to the "0" position, latching up the high-order carry-over contact 62. The operation which has just taken place may be described arithmetically as follows:

| In accumulator | 1 | 1 | 0 | 1 |
|---|---|---|---|---|
| High-order pulse from complement relay | 1 | | | |
| | 0 | 1 | 0 | 1 |

The cycle proceeds, with the read cam transferring through the a contacts the 8's complement of 2, which consists of energizing pulses for the electromagnets 56 of the second and third orders. Since the second order cam was in a zero position previously, this does not latch up its carry-over contact. Since the third order carry-over wheel was in a 1 position previously, this latches up its carry-over contact so that when the carry-over cams actuate their respective switches, a circuit is established for the electromagnet 56 of the high-order carry-over wheel so that it is notched forward again to a 1 position. The operation just described may be set forth mathematically as follows:

| Accumulator position | 0 | 1 | 0 | 1 |
|---|---|---|---|---|
| −2 (from read relay and a contacts) | | 1 | 1 | 0 |
| | 0 | 0 | 1 | 1 |
| Carry-over | 1 | | | |
| | 1 | 0 | 1 | 1 |

The four accumulator wheels now read 11 in binary notation.

The high-order carry-over contact 62 is latched up, but when the output cam 75 closes contact 75a to check the position of that lever, the circuit through front contact 62b of the high-order carry lever is open at contact 89d of the negative polarity control relay, so that no output pulse is transmitted.

*Addition of +7 to +11 in the accumulator*

Let it now be assumed that before the next transfer cycle the converter motor 2 drives the cams 18a, 19a and 20a to their +7 position, in which, as mentioned above, each of the contacts 84, 85 and 86 is closed in its a position.

The return of the shaft of the converter motor through its zero position caused de-energization of relay 33, so that when detent cam 68 closes its contact 68a, the energizing circuit for positive polarity control relay 88 is re-established and picks up. This relay remains energized throughout the cycle through its holding winding. Energization of relay 88 opens the circuit to the complement relay 87 so that it does not pick up when complement cam 77 closes switch 77a.

When read cam 76 closes switch 76a, each of the three low-order carry-over wheels is advanced one notch by energization of its electromagnet 56. The first and second order carry-over wheels, which were in their "1" positions, are thereby advanced to zero position, and latch up their associated carry-over contacts 62. This portion of the cycle may be illustrated mathematically as follows:

| Previous accumulator wheel setting | 1 | 0 | 1 | 1 |
|---|---|---|---|---|
| +7 (from read relay and a contacts) | | 1 | 1 | 1 |
| New accumulator wheel setting | 1 | 1 | 0 | 0 |

Both the first and second order carry-over contacts 62 are latched up, so that when the carry-over cams close their contacts, carry-over circuits are completed for the second and third order electromagnets 56, which thereby advance their associated wheels. In the case of the third order wheel, this means a movement from a 1 position to a 0 position thereby latching up its carryover contact which was not previously closed. Note, however, that the high portion of the carry-over cam 73 is longer than the high portions of the lower order carry-over cams, and maintains the switch 73a for the third order carry-over closed for a longer time than the lower order carry-over circuits, so that when switch 62 in the third order closes, an energizing circuit is completed through switch 73a for the electromagnet 56 in the fourth order.

Since the fourth order carry-over wheel was in a 1 position, this energization of its electromagnet 56 moves it to a zero position, thereby latching up the high-order carry-over contact 62. The carry-over operations just described may be indicated mathematically as follows:

| | | | | |
|---|---|---|---|---|
| Previous accumulator wheel setting | 1 | 1 | 0 | 0 |
| Carry-over cams first close | | 1 | 1 | |
| | 1 | 0 | 1 | 0 |
| Third order carry-over | | 1 | | |
| Final accumulator wheel setting | 0 | 0 | 1 | 0 |

It may be seen that the accumulator now registers +2 in the binary notation and that the high-order carry contact 62 is latched up. When the output cam 75 closes its contact 75a, a positive output pulse circuit is completed. This circuit may be traced from the negative supply line 94 through switch 75a, contacts 62, 62b, front contact 88d, and the integral indicator 6 to the positive supply line 93. This positive pulse informs the indicator 6 that the accumulator has operated through its full capacity. The indicator 6 registers this information or makes such additional or alternative use of it as the particular system may require.

Subtraction of —6 from +2

Let it be assumed that before the next transfer cycle, the motor 2 drives shaft 2a in a counterclockwise direction back through its zero position to a —6 position. In that position, as shown in Table I above, the a contacts register the 8's' complement of 6 or 2. When the shaft 2a passed through zero, the input signal polarity indicated relay 33 picked up. The read-out relay at this time is still de-energized. Consequently, when the detent cam 68 closes switch 68a neither of the energizing circuits for polarity control relays 88 and 89 is completed, so that these two relays remain de-energized throughout the remainder of the cycle.

When the complement cam 77 closes contact 77a, the energizing circuit for relay 87, previously described, is completed, thereby providing a pulse to the high-order electromagnet 56 through contact 87a. This moves the high-order carry-over wheel from a "0" position to a "1" position, so that its carry-over contact is not latched up. The read cam then energizes the read relay 83 and the indication from the a contacts is read into the accumulator. This advances the second order wheel one notch, moving it to a "0" position and latching up its carry-over contact 62 so that during the subsequent carry-over portion of the cycle the third order carry-over wheel is advanced to a "1" position. The operations thus far in this cycle may be expressed mathematically as follows:

| | | | | |
|---|---|---|---|---|
| Previous accumulator setting | 0 | 0 | 1 | 0 |
| Complement relay | 1 | 0 | 0 | 0 |
| | 1 | 0 | 1 | 0 |
| (8's' complement of 6) from a contacts | | 0 | 1 | 0 |
| | 1 | 0 | 0 | 0 |
| Carry-over | | 1 | | |
| Present accumulator setting | 1 | 1 | 0 | 0 |

It may be seen that the accumulator now registers 12, which, of course, is not correct for the subtraction of —6 from +2. The number now registered in the accumulator, 12, is the 16's' complement of 4, which is the number desired to be registered in the accumulator. the 16's' complement of a number, expressed in binary notation, may be converted to that number by reversing all the digits and adding a fugitive 1.

In the present example, take the accumulator

| | | | | |
|---|---|---|---|---|
| Setting, | 1 | 1 | 0 | 0 |
| Reverse all digits setting | 0 | 0 | 1 | 1 |
| Add the fugitive 1 and carry | | | | 1 |
| New accumulator setting | 0 | 1 | 0 | 0 equals 4 |

The reversal of all the digits changes the number to its 15's' complement, and in order to change it to the desired 16's' complement, the fugitive 1 must be added.

These functions are accomplished in the accumulator by the conversion relay 90 and its associated mechanisms. That relay controls contacts which supply reversing pulses to the second, third and fourth order carry-over wheels. The addition of the fugitive 1 to the lower order is accomplished by simply omitting to reverse it. The carry-overs which may be required during the adidtion of the fugitive 1 are accomplished by making the reversal of the higher order wheels conditional upon the position of the lower order wheels. More specifically, if the low order wheel is in a "0" position, indicating that a reversal plus a fugitive 1 would produce a carry-over to the second order, then the reversing pulse is blocked from the second order electromagnet. If both the low and second order wheels are in "0" positions, the reversing pulse is blocked from the third order electromagnet. If all three of the low order wheels are in "0" positions, the reversing pulse is blocked from the fourth order electromagnet.

Reviewing this operation in detail, when the output cam 75 closes its contact 75a, a circuit is established for the conversion relay 90. This circuit may be traced from the negative supply line 94 through switch 75a, contacts 62, 62a, contacts 89b, 88b, the winding of relay 90 and thence through the wire 100 to positive supply line 93.

Energization of conversion relay 90 closes its contact 90a (see Figure 3), thereby supplying an energizing pulse to the electromagnets 56 of the second, third and fourth order accumulator wheels, if, in each case, one of the lower order accumulator wheels is in its "1" position.

All the 110a contacts of the position checking switch levers 110 are connected in parallel and these parallel switch contacts are connected in series with relay contact 90a and with the winding of the fourth order accumulator electromagnet 56. The reversing pulse to this electromagnet through contact 90a is therefore blocked only when all three of the lower order accumulator wheels are in their "0" positions.

Both the 110b contacts of the first and second order position checking switch levers 110 are connected in parallel, and these parallel switch contacts are connected in series with relay contact 90a and with the winding of the third order accumulator electromagnet 56. The reversing pulse to this electromagnet is therefore blocked only when the first and second order wheels are both in their "0" positions.

The 110c contact of the first order position checking switch lever 110 is connected in series with relay contact 90a and with the winding of the second order electromagnet 56. The contact 110c blocks the reversing pulse to the second order electromagnet when the first order wheel is in its "0" position. In the present cycle, both the first and second order carry-over wheels are in zero positions and therefore the levers 110 and 111 have opened their associated contacts, so that no conversion pulse can be received by either the second or third order electromagnets 56. The third order accumulator wheel is in its "1" position. Consequently, the conversion relay only transmits a conversion pulse to the high-order accumulator wheel, transferring it from a 1 position to a 0 position. The operation of the conversion phase of this transfer cycle may be described arithmetically as follows:

```
Previous accumulator setting   1  1  0  0
Conversion cycle               1
                              ─────────────
                               0  1  0  0
```

Note that the total carried by the accumulator is now 4 in the binary notation. Furthermore, the energization of conversion relay 90 operated the ratchet mechanism 91 to complete the energizing circuit for the read-out relay 92, to indicate that the total registered in the accumulator is negative. Consequently, the total now registered is −4 which is the correct total for subtraction (algebraic addition) of a −6 from a +2.

*Algebraic addition of −7 to −4 in the accumulator*

When the read-out relay 92 was energized during the conversion cycle phase of the last transfer cycle, it transferred the operation of the read relay from the *a* contacts to the *b* contacts. Referring once more to Table I, it may be seen that when the cams 18*a*, 19*a* and 20*a* are moved in the negative direction from their zero positions and the accumulator signals are taken from the *b* contacts, these signal represent, in the binary system, the number of unit angular displacements through which the cams move minus one. In order to correct the accumulator signals for this subtracted one, there is provided a carry-over cam 70 operating a switch 70*a*, which together with a contact 92*d* of read-out relay 92, controls a circuit to supply an extra energizing pulse to the lowe order electromagnet 56, during every transfer cycle when the accumulator is operating from the *b* contacts.

Assume that before the next transfer cycle the motor 2 drives the cams 18*a*, 19*a* and 20*a* to their −7 position. Referring to Table I, it may be seen that the *b* contacts in the −7 position will transfer to the accumulator the binary quantity expressed as

```
              1  1  0
```

During the transfer cycle the read and carry-over operations proceed as before, except that the *b* contacts are used rather than the *a* contacts. The operation may be expressed mathematically as follows:

```
Previous accumulator
    wheel setting        0  1  0  0
From cam contacts b         1  1  0
                        ─────────────
                         0  0  1  0
Carry-over               1        1
                        ─────────────
New accumulator
    wheel setting        1  0  1  1
```

The new accumulator wheel setting corresponds to 11 in the binary notation, and the read-out relay is energized to show that the total is negative, or −11, which is the correct total for the addition of −7 to −4.

*Addition of −7 to −11 in the accumulator*

Assume that the converter remains in its −7 position until the following transfer cycle, at which time −7 is added to the −11 in the accumulator, resulting in a total of −18 which is 2 more than the accumulator capacity (−16). The accumulator accordingly produces a negative output pulse and indicates a total of −2.

The previous accumulator wheel setting was

```
              1  0  1  1
```

To this there was transferred from the *b* contacts the quantity 1 1 0, which changed the settings of the accumulator wheels to 1 1 0 1 and latched up the carry-over lever of the second order. During the carry-over cycle the low order electromagnet receives a pulse through switch 70*a* and contact 92*d* of read-out relay 92, which advances the ratchet wheel 59 of the low order and latches up the carry-over lever 61 of that order thereby transferring a carry-over pulse to the second order accumulator wheel, which is accordingly removed to its "1" position. The carry-over from the second order wheel advances the third order wheel to a "0" position, thereby latching up its carry-over lever and sending a carry-over impulse to the highest order electromagnet, which also moves to its "0" position, thereby latching up its carry-over lever 61.

When the output cam 75 closes the switch 75*a* at the end of the carry-over, a circuit is completed which may be traced from the negative supply line 94 through swtich 75*a*, carry-over switch 62*b*, back contact 88*d* of positive polarity control relay 88 and front contact 89*d* of negative polarity control relay 89 and thence through the negative output line 111 to the integral indicator 6 and thence through conductor 112 back to the positive supply line 93.

This operation may be described mathematically as follows:

```
Previous accumulator
    wheel setting        1  0  1  1
From cam contacts           1  1  0
                        ─────────────
                         1  1  0  1
Carry-over                  1     1
                        ─────────────
New accumulator
    wheel setting        0  0  1  0
```

It may be seen that the accumulator is left with a total of −2.

*Addition of +3 to −2 in the accumulator*

It is now assumed that the converter shifts from its −2 position to its +3 position before the next transfer cycle. As the read phase of the next transfer cycle takes place, the read-out relay is still energized, so that the electromagnets 56 are energized through the *b* contacts. Since the input signal is now positive, the sign discriminating relay 33 is de-energized. The read-out relay 92 remains energized. Consequently, the circuits for both the polarity control relays 88 and 89 remain de-energized. When the complement cam 77 closes switch 77*a*, the complement relay 87 is energized and supplies an energizing pulse to the high order electromagnet. The reading or transfer from the *b* contacts follows, with the carry-over afterwards, in sequence. In this instance, the only carry-over is from the switch 70*a* to the low order electromagnet to supply the fugitive 1. All four of the accumulator wheels are then in their "1" postions. When the output cam 75 closes switch 75*a*, the energizing circuit for conversion relay 90 is completed through switch 75*a*, switch 62, 62*a* and back contacts 89*b* and 88*b*. The conversion cycle follows, with all contacts except the low order being reversed. Since all the accumulator wheels are in the "1" position, there is no carry-over. The accumulator then finally registers "1" in its low order position which is the correct total for the addition of +3 to −2. Note that energization of the conversion relay 90 operates ratchet mechanism 91 to de-energize the read-out relay, thereby indicating the accumulator total as positive.

This transfer cycle may be expressed mathematically as follows:

```
Previous accumulator
    wheel setting           0 0 1 0
From complement relay       1
                          ─────────
                            1 0 1 0
From cam contacts (b)         1 0 0
                          ─────────
                            1 1 1 0
Carry-over (b)                    1
                          ─────────
                            1 1 1 1
Conversion cycle            1 1 1
                          ─────────
                            0 0 0 1
```

*Fig. 5*

This figure illustrates a modified form of converter mechanism which may be used in place of the mechanism illustrated in Fig. 2. Many of the component elements in the converter of Fig. 5 are the same as their counterparts in Fig. 2. These elements have been indicated by the same reference numerals in Fig. 5 as in Fig. 2, and will not be further described.

The principal difference between the converter of Fig. 5 and the converter of Fig. 2 is the use of transformers 115, 116 and 117 in the feedback circuit in place of the resistors 41 to 46 in the converter of Fig. 2. Also, the contact structure operated by the cams 18, 19 and 20 has been modified. The cams 18, 19 and 20 operate followers 118, 119 and 120, positioning movable contacts 118a, 119a and 120a between upper stationary contacts 118b, 119b and 120b and lower stationary contacts 118c, 119c and 120c.

The transformers 115, 116 and 117 have primary windings 115a, 116a and 117a and secondary windings 115b, 116b and 117b. The energizing circuits for the primary windings of the transformers are controlled by the contacts 118a, 119a and 120a. Another transformer 121 is provided having a primary winding 121a and a secondary winding 121b.

The feedback signal is introduced to the input circuit of amplifier 12 at input terminal 48 through the resistor 49, the secondary windings 121b, 115b, 116b and 117b in series and thence through the ground connections 122 and 13 to the opposite amplifier input terminal. The secondary windings 115b, 116b and 117b have different number of turns producing voltages respectively proportional to the binary orders which they represent. In the arrangement shown, winding 115b, representing the lowest order, has two turns. Winding 116b representing the next highest order, has four turns while winding 117b, representing the third order, has eight turns. The primary windings of all the transformers have an equal number of turns.

The energizing circuits for the primary windings 115a, 116a and 117a are supplied from a transformer 123 having a secondary winding 124 with a grounded center tap 125. The input sign discriminating relay 33 is in this case provided with a front contact 33d connected to the upper terminal of the secondary winding 124 and a back contact 33c connected to its lower terminal. When the relay 33 is de-energized, indicating that the input signal is positive, the circuit for energizing the primary windings extends through contact 33e. When relay 33 is energized, indicating that the input signal is negative, the circuit for energizing the transformer primary windings extends through contact 33d, and hence the transformer primary windings are then energized with current of the opposite polarity. The respective secondary windings have potentials induced in them when their respective primary windings are energized and have substantially no potentials in them when their respective windings have their circuits open. The primary winding circuits are all connected in parallel.

It will be readily understood that the primary winding circuits are opened or closed depending on whether or not a digit is indicated in the particular binary order by the associated cams 18, 19 and 20. Since the secondary voltages are proportional to the magnitudes of the orders, the feedback potential which is the sum of the potentials at the terminals of the secondary windings in series, represents digitally the binary quantity indicated by the position of the cams 18, 19 and 20.

It may be seen that transformer 121 is energized only when the converter is operated from the 33d contact, i.e., when the input signal is negative. This function is similar to that of resistor 47 in Fig. 2, namely to supply a feedback potential equal to the fugitive 1 when the feedback signal is being controlled by the b contacts, i.e., when the input signal is positive.

The transformers 115, 116 and 117 are shown as having toroidal cores 115c, 116c and 117c. This form of core provides much higher accuracy in the input-output voltage ratio than other core forms.

In both the converter of Fig. 2 and that of Fig. 5, the accuracy of the feedback potential and hence the accuracy of the entire integrating apparatus depends upon the accuracy with which the highest order impedance element (either the resistor or transformer) may be made to represent its particular binary order.

It is presently known how to build resistors or transformers with accuracies greater than one part in one thousand, and hence it is possible to construct an integrating apparatus of the type described with correspondingly high accuracy. Of course, it will be understood that it is necessary to use a sufficient number of code wheels to carry the number of decimal digits in the highest order wheel up to a magnitude that will produce the desired accuracy.

I claim as my invention:

1. An integrator for an electrical input signal continuously variable through a finite range including both positive and negative values, comprising converter means operable to convert the instantaneous value of said signal into ordinally related digital signals, means to sense whether the digital signals are positive or negative, an accumulator, means operable periodically to transfer the digital signals to the accumulator, means to sense whether the total registered in the accumulator is positive or negative, means including both said sensing means and effective when both the digital signals and the total have the same sign to add the digital signals to the total and when the digital signals and the total have different signs to subtract the digital signals from the total, an integral indicator, and means including said accumulator and said total sensing means to control said indicator in accordance with the total in the accumulator and the sign of said total.

2. An integrator for a continuously variable electrical input signal, comprising a balanceable electrical network, means to transmit said signal to said network, a reversible motor controlled by said network to remain stationary when the network is balanced, and to run when the network is unbalanced in a direction determined by the sense of unbalance of the network, converter means driven by said motor and effective to produce a feedback signal varying in magnitude in accordance with the travel of said converter means from a normal zero position and in polarity in accordance with the direction of movement of the converter means from said zero position, means to transmit said feedback signal to said network in a sense to oppose said input signal, means in said converter means to convert the instantaneous value of the feedback signal into ordinally related digital signals, an accumulator, means operable periodically to transfer the digital signals to the accumulator, an integral indicator, and means including said accumulator to control said indicator in accordance with the total in the accumulator.

3. An integrator for an electrical input signal continuously variable through a range including both positive and negative values, comprising a balanceable electrical network, means to transmit said signal to said network, a reversible motor controlled by said network to remain stationary when the network is balanced, and to run when the network is unbalanced in a direction determined by the sense of unbalance of the network, converter means driven by said motor and effective to produce a feedback signal varying in magnitude in accordance with the travel of said converter means from a normal zero position and in polarity in accordance with the direction of movement of the converter means from said zero position, means to transmit said feedback signal to said network in a sense to oppose said input signal, means in said converter means to convert the instantaneous value of the feedback signal into ordinally related digital signals, means to sense the direction of movement of the converter means from said zero position and thereby to determine whether the digital signals are positive or negative, an accumulator, means operable periodically to transfer the series of digital signals to the accumulator, means to sense whether the total registered in the accumulator is positive or negative, means including both said sensing means and effective when both the digital signals and the total have the same sign to add the digital signals to the total and when the digital signals and the total have different signs to subtract the digital signals from the total, an integral indicator, and means including said accumulator and said total sensing means to control said indicator in accordance with the total in the accumulator and the sign of said total.

4. An analog-digital converter for converting a continuously variable input signal into ordinally related digital signals, comprising a balanceable electrical network, means to transmit said input signal to said network, a reversible motor controlled by said network to remain stationary when the network is balanced and to run when the network is unbalanced in a direction determined by the sense of unbalance of the network, ordinally related signal generating means driven by the motor, means operated by said signal generating means to produce a feedback signal corresponding in magnitude to the digits in their respective order indicated by the position of the signal generating means, means connecting the feedback signal producing means in a circuit so that the sum of all the signals produced therein is a measure of the distance traveled by the signal generating means from a normal zero position, means connecting said circuit in said network so that the said signal sum opposes said input signal, and the motor is stopped when the signal generating means digitally measures the input signal.

5. An analog-digital converter for converting a continuously variable input signal into ordinally related digital signals, comprising a balanceable electrical network, means to transmit said input signal to said network, a reversible motor controlled by said network to remain stationary when the network is balanced and to run when the network is unbalanced in a direction determined by the sense of unbalance of the network, ordinally related cams driven by the motor, means operated by each cam to produce a feedback signal corresponding in magnitude to the digit in its respective order indicated by the cam position, the sum of all the signals produced being a measure of the distance traveled by the cams from a normal zero position, means connecting the feedback signal producing means of all the cams in series, means connecting said series of feedback signal producing means into said network so that said signal sum opposes said input signal, and the motor is stopped when the cam positions digitally measure the input signal.

6. An analog-digital converter for converting a continuously variable input signal into equivalent binary digital signals, comprising a balanceable electrical network, means to transmit said input signal to said network, a reversible motor controlled by said network to remain stationary when the network is balanced and to run when the network is unbalanced in a direction determined by the sense of unbalance of the network, ordinally related binary cams driven by the motor, means operated by each cam as it reaches angular positions measured by binary numbers including a digit in its respective order to produce a feedback signal potential corresponding in magnitude to said respective order, the sum of all the feedback signal potentials being a measure of the angular distance traveled by the cams from a normal zero position, means connecting the feedback signal producing means of all the cams in series to said network so that said signal potential sum opposes said input signal, and the motor is stopped when the cam positions digitally measure the input signal.

7. An analog-digital converter as defined in claim 6, in which said feedback signal producing means for each cam comprises a transformer having a primary winding and a secondary winding, an energizing circuit for the primary winding, and a switch for opening and closing said circuit and operated by said cam, said transformers having voltage ratios proportional to their respective orders, and in which said connecting means connects all said secondary windings in series to the network, so that the sum of the potentials across said secondary windings in series opposes said input signal.

8. An analog-digital converter as defined in claim 6, in which said feedback signal producing means for each cam comprises a resistor and means for shunting said resistor including a contact operated by its associated cam, the resistors for said signal producing means having resistance values proportional to their respective orders, and in which said connecting means connects all said resistors in a series group to said network so that the potential drop across all said resistors in series opposes said input signal; and including means for transmitting a substantially constant current through all said resistors in series.

9. An analog-digital converter as defined in claim 8, in which said constant current transmitting means comprises a second group of resistors respectively equal in resistance to the resistors of said first-mentioned group, means for shunting each resistor of the second group including a contact operated by the same cam which operates the shunting contact for the equal resistor in the first group, said shunting contacts for each cam being connected so that when one is open the other is closed, a source of electrical potential, means connecting said source across said two groups of resistors in series, each said cam being effective when opening the shunt around a resistor in the first group to close the shunt around an equal resistor in the second group, so that the total resistance across said source remains constant and the current flow through said resistors remains constant.

10. Apparatus for producing an electric potential varying digitally in accordance with a variable quantity, comprising first and second groups of resistors, the resistors of each group having resistance values respectively proportional to the orders in a binary system and equal to the resistance values of the corresponding resistors in the other group, a plurality of switches, each connected to shunt one of said resistors when it is closed, a plurality of switch operating means, each said operating means being operatively connected to the two switches shunting one resistor in one group and the equal resistor in the other group to close one of the two switches when the other is open, each switch operating means representing the order of said binary system corresponding to the two resistors whose shunting switches it controls, cam means to position said plurality of switch operating means in accordance with the variations of said variable quantity so that the positions of the switches measure said variations according to said binary system, a source of electrical potential, means connecting said source across said two groups of resistors in series, each said cam means being effective when opening the shunt around a resistor in the first group to close the shunt around an equal resistor in the second group, so that the total resistance across said source remains constant and the current flow through said resistors remains constant and the potential across one of said groups varies digitally in accordance with said variable quantity.

11. Motor control apparatus, comprising a motor, signal input means having a pair of signal input terminals and operable to supply a variable input signal, an amplifier having input terminals and output terminals, means connecting said amplifier output terminals to said motor, said motor having characteristics such that it remains stationary when no signal is applied to said amplifier input terminals, and runs when a signal is applied to the amplifier input terminals in a direction determined by the polarity of the applied signal, a device driven by said motor for producing a feedback signal variable in accordance with the position of said device, a pair of resistance means, a pair of parallel branch circuits connected between said amplifier input terminals, one of said branch circuits including in series one of said resistance means and said signal input means, the other of said branch circuits including in series the other of said resistance means and said feedback signal producing device, both said resistance means being connected to one of the amplifier input terminals, said feedback signal producing device being connected to introduce into its branch circuit a feedback signal whose polarity with respect to said one amplifier input terminal is opposite to that of the input signal, so that when the potentials of the input signal and the feedback signal are equal in magnitude, those potentials are opposed in said parallel branch circuits, and said amplifier input terminals are at the same potential.

12. Motor control apparatus, comprising a motor, signal input means having a pair of signal input terminals and operable to supply an input signal variable through a finite range including both positive and negative values, an amplifier having input terminals and output terminals, means connecting said amplifier output terminals to said motor, said motor having characteristics such that it remains stationary when no signal is applied to said amplifier input terminals and runs when a signal is applied to the amplifier input terminals in a direction determined by the polarity of the applied signal, a device driven by said motor for producing a feedback signal variable in accordance with the position of said device, said device having a normal position corresponding to zero feedback signal and being movable in either direction from said normal position, means in said feedback signal producing device to control the polarity of the feedback signal in accordance with the direction of departure of the device from said normal position, a pair of resistance means, a pair of parallel branch circuits connected between said amplifier input terminals, one of said branch circuits including in series one of said resistance means and said signal input means, the other of said branch circuits including in series the other of said resistance means and said feedback signal producing device, both said resistance means being connected to one of the amplifier input terminals, said feedback signal producing device being connected to introduce into its branch circuit a feedback signal whose polarity with respect to said one amplifier input terminal is opposite to that of the input signal, so that when the potentials of the input signal and the feedback signal are equal in magnitude, those potentials are opposed in said parallel branch circuits, and said amplifier input terminals are at the same potential.

13. Motor control apparatus as defined in claim 12, in which said feedback signal producing device comprises first and second groups of resistors, the resistors of each group having resistance values respectively proportional to the orders in a binary system and equal to the resistance values of the corresponding resistors in the other group, a plurality of switches, each connected to shunt one of said resistors when it is closed, a plurality of switch operating means, each said operating means being operatively connected to the two switches shunting one resistor in one group and the equal resistor in the other group to close one of the two switches when the other is open, each switch operating means representing the order of said binary system corresponding to the two resistors whose shunting switches it controls, and a driving connection between said motor and said series of switch operating means so that the positions of said switches measure the input signal according to said binary system, a source of electrical potential, means connecting said source across said two groups of resistors in series, each said switch operating means being effective when opening the shunt around a resistor in the first group to close the shunt around an equal resistor in the second group, so that the total resistance across said source remains constant while the potential across one group varies digitally in accordance with said variable quantity, and means connecting said one group in the other of said branch circuits in series with said other resistance means.

14. Motor control means as defined in claim 13, in which said means to control the polarity of the feedback signal is effective selectively to connect in said other branch circuit a particular one of said resistor groups when the device moves in a positive direction from said normal position and the other of said resistor groups when the device moves in a negative direction from said normal position, and an additional resistor without a shunting switch and connected in series with said other group and having a resistance equal to the lowest order resistance in said binary system, said additional resistor being effective to supply a "fugitive one" potential in said feedback signal.

15. A binary accumulator including, for each order, an electromagnet; a ratchet wheel operatively connected to the electromagnet and advanced one step on each energization thereof; cam means driven by said ratchet wheel; a follower for said cam means movable between a normal position and a lifted position; means effective to hold said follower in its lifted position after it is moved thereto by said cam means, said cam means being contoured to move said follower to its lifted position upon each alternate one-step advancement of the ratchet; a first carry-over switch closed by said follower in its lifted position; a digit register switch; means for operating said digit register switch to indicate a digit to be read into the accumulator; a read switch, movable between first and second circuit-closing positions; a digit register circuit including said digit register switch, said read switch in its first circuit-closing position and said electromagnet; a carry-over cam; a second carry-over switch actuated by said carry-over cam; a carry-over circuit including in series said first and second carry-over switches of the next lower order, said read switch in its second position, and said electromagnet; and means for restoring the follower to its normal position.

16. A binary accumulator including, for each order, an electromagnet; a ratchet wheel operatively connected to the electromagnet and advanced one step on each energization thereof; cam means driven by said ratchet wheel; a follower for said cam means movable between a normal position and a lifted position; means effective to hold said follower in its lifted position after it is moved thereto by said cam means; said cam means being contoured to move said follower to its lifted position upon each alternate one-step advancement of the ratchet; a first carry-over switch closed by said follower in its lifted position; a digit register switch; means for operating said digit register switch to indicate a digit to be read into the accumulator; a read switch movable between first and second circuit-closing positions; a digit register circuit including said digit register switch, said read switch in its first circuit-closing position and said electromagnet; a carry-over cam; a second carry-over switch actuated by said carry-over cam; and a carry-over circuit including in series said first and second carry-over switches of the next lower order, said read switch in its second position, and said electromagnet; and sequence control means for sequentially actuating: first, the digit register switches of the various orders selectively in accordance with a number to be accumulated; second, the read switches of all the orders to their first circuit-closing positions to transfer to the accumulator the digits indicated by the digit register switches; third, the read switches to their second circuit-closing positions and actuating the second carry-over switches of all the orders to complete carry-over circuits for those orders whose first carry-over switches have been closed; and fourth, restoring all the followers to their normal positions.

17. A binary accumulator as defined in clai m16, in which the carry-over cams are contoured to close their respective switches simultaneously and to open their switches sequentially according to their order in the binary system, with the lowest order switch being opened first.

18. A binary accumulator as defined in claim 17, including an output checking switch, an output cam in said sequence control means contoured to close said output checking switch after the highest order of the second carry-over switches is opened, and a circuit including said output checking switch and the first carry-over switch of the highest order.

19. An integrator for an electrical input signal variable throughout a range including both positive and negative values, comprising means to convert said input signal into digital signals ordinally related according to a binary system, means responsive to the sign of said input signal, a binary accumulator including, for each order: a ratchet wheel having a first group of angularly spaced positions, each indicative of the registration of "0" in that order, pairs of positions of said first group being located on either side of one of a second group of angularly spaced positions, each indicative of the registration of "1" in that order, an electromagnet operatively connected to the ratchet wheel and effective upon each energization thereof to advance the ratchet wheel from a position of one group to a position of the other group, cam means driven by said ratchet wheel, a follower for said cam means movable between a normal position and a lifted position, means effective to hold said follower in its lifted position after it is moved thereto by said cam means, said cam means being contoured to move said follower to its lifted position upon each advancement of the ratchet from a "1" position to a "0" position, a first carry-over switch closed by said follower in its lifted position, a digit register switch controlled in accordance with one of the digital signals, a read switch movable between first and second circuit-closing positions, a digit register circuit including said digit register switch, said read switch in its first circuit-closing position and said electromagnet, a carry-over cam, a second carry-over switch actuated by said carry-over cam, and a carry-over circuit including in series said first and second carry-over switches of the next lower order, said read switch in its second position, and said electromagnet; means responsive to the sign of the total registered in said accumulator, a pair of polarity control relays controlled by said input signal sign responsive means and said total sign responsive means, one of said polarity control relays being energized when both said signs are positive and the other when both signs are negative, a complement relay and circuits controlled thereby effective when the complement relay is energized to supply an energizing current impulse to certain of said electromagnets to register the complement of the number registered by said digit register switches, a complement switch, a circuit for energizing said complement relay including said complement switch and back contacts of said polarity control relays, so that said complement relay is energized whenever the input signal sign and the total sign are opposite, and sequence control means for sequentially: first, actuating the digit register switches of the various orders selectively in accordance with said digital signals; second, closing said complement switch and re-opening it; third, moving the read switches of all the orders to their first circuit-closing positions to transfer to the accumulator the digits indicated by the digit register switches; fourth, restoring the read switches to their second circuit-closing positions and actuating the second carry-over switches of all the orders to complete carry-over circuits for those orders whose first carry-over switches have been closed; and fifth, restoring all the followers to their normal positions.

20. An integrator as defined in claim 19, including an output checking switch, an output cam in said sequence control means contoured to close said output checking switch after the highest order of the secondary carry-over switches is opened, positive and negative output lines, a positive output circuit including in series: said output checking switch, the first carry-over switch of the highest order, a front contact of said positive polarity control relay, and said positive output line; and a negative output circuit including in series: said output checking switch, the first carry-over switch of the highest order, a front contact of said negative polarity control relay, and said negative output line.

21. An integrator as defined in claim 20, in which said first carry-over switch of the highest order includes a contact closed when its associated follower is in its normal position, a conversion relay, means responsive to energization of said conversion relay for shifting said total sign responsive means from one sign indicating condition to the order, means responsive to energization of said conversion relay for shifting the total registered in the accumulator to a complement thereof, and an energizing circuit for said conversion relay including in series said output checking switch, said normally closed contact of the first carry-over switch of the highest order, and back contacts of both said polarity control relays.

References Cited in the file of this patent

UNITED STATES PATENTS

| | | |
|---|---|---|
| 2,527,661 | Stack | Oct. 31, 1950 |
| 2,586,173 | Nelsen | Feb. 19, 1952 |
| 2,630,552 | Johnson | Mar. 3, 1953 |
| 2,631,778 | Piper | Mar. 17, 1953 |
| 2,654,049 | Clark | Sept. 29, 1953 |
| 2,656,498 | Goodwin | Oct. 20, 1953 |
| 2,668,662 | Roth | Feb. 9, 1954 |
| 2,671,610 | Sweer | Mar. 9, 1954 |
| 2,700,501 | Wang | Jan. 25, 1955 |

UNITED STATES PATENT OFFICE

CERTIFICATE OF CORRECTION

Patent No. 2,932,449　　　　　　　　　　　　　　April 12, 1960

Harry G. Pisarchik

It is hereby certified that error appears in the printed specification of the above numbered patent requiring correction and that the said Letters Patent should read as corrected below.

Column 15, line 14, strike out "in"; column 19, line 31, for "signal" read -- signals --; line 38, for "lowe" read -- low --; column 28, line 32, for "secondary" read -- second --; line 48, for "order" read -- other --.

Signed and sealed this 15th day of November 1960.

(SEAL)
Attest:

KARL H. AXLINE　　　　　　　　　　　　　　　ROBERT C. WATSON
Attesting Officer　　　　　　　　　　　　　　Commissioner of Patents